(12) United States Patent
Hartman

(10) Patent No.: US 11,365,899 B2
(45) Date of Patent: Jun. 21, 2022

(54) PERSONAL WORKSPACE AIR SUPPLY AND COMFORT CONDITIONING UNIT

(71) Applicant: Thomas Hartman, Georgetown, TX (US)

(72) Inventor: Thomas Hartman, Georgetown, TX (US)

(*) Notice: Subject to any disclaimer, the term of this patent is extended or adjusted under 35 U.S.C. 154(b) by 0 days.

(21) Appl. No.: 17/364,008

(22) Filed: Jun. 30, 2021

(65) Prior Publication Data

US 2022/0003450 A1    Jan. 6, 2022

Related U.S. Application Data

(63) Continuation-in-part of application No. 17/175,356, filed on Feb. 12, 2021.

(60) Provisional application No. 63/047,141, filed on Jul. 1, 2020.

(51) Int. Cl.
| | |
|---|---|
| F24F 11/77 | (2018.01) |
| F24F 11/523 | (2018.01) |
| F24F 11/56 | (2018.01) |
| F24F 13/06 | (2006.01) |
| F24F 11/64 | (2018.01) |
| F24F 120/12 | (2018.01) |
| F24F 110/10 | (2018.01) |

(52) U.S. Cl.
CPC ........... *F24F 11/77* (2018.01); *F24F 11/523* (2018.01); *F24F 11/56* (2018.01); *F24F 11/64* (2018.01); *F24F 13/06* (2013.01); *F24F 2110/10* (2018.01); *F24F 2120/12* (2018.01)

(58) Field of Classification Search
None
See application file for complete search history.

(56) References Cited

U.S. PATENT DOCUMENTS

| | | | |
|---|---|---|---|
| 2015/0370927 A1* | 12/2015 | Flaherty | F24D 19/1084 703/1 |
| 2019/0041883 A1* | 2/2019 | Clark | G06F 1/3231 |
| 2021/0048208 A1* | 2/2021 | Moffitt | F24F 11/0001 |
| 2021/0148591 A1* | 5/2021 | Craft | F24F 11/38 |

* cited by examiner

*Primary Examiner* — Nathan L Laughlin
(74) *Attorney, Agent, or Firm* — Micah D. Stolowitz

(57) ABSTRACT

In a commercial building, an improved terminal unit achieves individual occupant thermal comfort with optimal cost and energy efficiency through the integration of at least two local thermal comfort components into a single terminal unit along with a communication network that may incorporate additional thermal components and also employs emerging optimization principles to meet individual preferences for the thermal environment in a workspace basis while reducing overall zone or building energy use and operating in accordance with any constraints on the energy grid(s) that serve the buildings. These multiple objectives are met in part through the multi-comfort factor individual workspace control and a robust communication network that to coordinate thermal conditioning with neighboring workspaces.

12 Claims, 5 Drawing Sheets

PERSONAL WORKSPACE AIR SUPPLY AND COMFORT CONDITIONING UNIT

RELATED APPLICATIONS

This application is a non-provisional of U.S. Provisional Application No. 63/047,141 filed Jul. 1, 2020 and a continuation-in-part of pending U.S. application Ser. No. 17/175,356 filed Feb. 12, 2021. The provisional application and the parent case are incorporated herein by this reference.

COPYRIGHT NOTICE

©2020-2021 Thomas Hartman. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure is in the field of commercial building heating, ventilation, and air conditioning ("HVAC") and pertains to methods, systems and apparatus to implement an intelligent and interactive personal workspace air supply and comfort conditioning unit.

BACKGROUND OF THE INVENTION

Thermal comfort (or discomfort) is a major complaint in commercial buildings. It is recognized that individual human variations in desired thermal environments makes the longstanding strategy of providing a uniform thermal environment throughout building spaces obsolete. A shift is now being made to providing commercial building occupants with some individual control over their workspace thermal environments. However, efforts are also underway to encourage the commercial building sector to become more energy efficient. Adding individual thermal control is seen as contrary to this effort since adding individual occupant control has historically resulted in an increase in the energy consumption of commercial buildings.

At the same time, environmental concerns are making the use of non-carbon emitting sources of energy more attractive. These sources which are being led by solar voltaic and wind generation have been shown to be sufficiently abundant to provide a substantial portion of energy requirements for electrical grids, but they lack the ability to predict and control the short-term capacity that traditional sources of building energy sources have. So, as these sources are integrated into electric grids, the ability to adjust loads to meet short term constraints within the grid as well as employ the lowest cost and most environmentally friendly energy sources is needed.

Variable air volume (VAV) systems are the most widely employed systems that provide comfort conditioning in large commercial office buildings. In a VAV system, each separately regulated temperature-controlled area is called a zone which typically employs a single thermostat or temperature sensor located somewhere in that zone that is used to regulate the flow of the primary air that conditions the zone. The flow of conditioned primary air is regulated to maintain a space temperature setpoint at the location of the thermostat. A commercial building zone is typically between several hundred and well over one thousand square feet in area and may contain from just a few to several dozens of occupants. The primary air that is used to condition each building zone is usually either too warm or too cool to be introduced directly to the occupants, So, air diffusers are used in VAV systems to distribute the conditioned primary air into the occupied areas of the building.

Air diffusers are employed to deliver conditioned primary air to the zone. Air diffusers operate to introduce primary air indirectly, by directing it along ceiling or sometimes wall surfaces and using the Coandă effect to keep the air stream flowing along ceiling or wall surfaces. There the primary air stream induces room air into the stream, and mixes with it to bring it closer to room conditions before it comes in contact with people. Typical air diffusers are passive devices with no moving parts. Diffusers simply direct the primary air along the ceiling or wall, or sometimes through a series of perforations to the space being conditioned. Multiple air diffusers typically connect directly to a variable air volume (VAV) system air outlet that serves the zone in which the air diffusers are located. (See FIG. 1.) The air diffusers that condition each zone may be connected directly to an air handler that regulates the temperature and flow of the primary air or may be connected through a secondary pressure or airflow regulating device such as a VAV box. Each diffuser is typically sized and located to distribute primary air up to several hundred square feet of space within the zone so that usually just several to a dozen or more diffusers distribute the conditioned air to each zone. A balancing damper, which may be a part of each diffuser, is fixed into a selected position during the initial system setup to balance the flow of conditioned air among the diffusers in each zone to try to maintain uniform space temperature conditions throughout the zone when the zone becomes occupied. The rate of air flow, and sometimes the temperature of the primary conditioning air delivered to each zone is regulated by the thermostat or temperature sensor located somewhere in the zone. Some diffuser applications are illustrated in drawing FIGS. 1 and 2.

What are sometimes called "Smart" or "Personal" Diffusers are not new. Products that currently exist in the marketplace such as the Acutherm "Therma-Fuser" or the Titus "Helios" are often referred to as "smart diffusers." These are ceiling mounted air diffusers that take the place of standard passive diffusers and have a thermostatically controlled damper that regulates the flow of primary air at each diffuser based on the local temperature measured by a sensor incorporated into or located nearby the smart diffuser. These smart diffusers can adjust airflow at each diffuser to achieve more uniform space temperature conditions in large zone areas. However, the indirect means of space conditioning employed by diffusers makes the use of smart diffusers unsuitable for achieving separate localized personal thermal comfort control at individual workstations in open office areas because air mixing from each diffuser typically occurs over larger areas that overlap with the air delivered and mixed from other diffusers near other workstations. This and the natural air mixing that occurs in open areas makes it difficult to regulate any substantial variance in space temperature that would be required to achieve the different thermal conditions for occupants among adjacent open workstations for true individualized comfort control.

Other devices such as those disclosed in U.S. Pat. No. 6,079,626 have been described that draw in room air and mix it with primary conditioning air in the air supply unit and then direct the already mixed air toward the workstation to better concentrate the mixed conditioned air toward specific discrete areas. These permit some degree of personal thermal control since the mixed air from the unit can be directly applied toward a specific workspace. However, because these prior art devices are regulated only by space temperature, they have limited capacity to allow individuals in adjacent open area workstations to experience any properly regulated variance in thermal comfort sensation, due to the natural air and thermal mixing that occurs in open areas and the reliance on space temperature as the control parameter.

Recent studies, such as a 2018 study titled "Percentage of commercial buildings showing at least 80% occupant satisfied with their thermal comfort" which analyzed occupants in 351 office buildings concludes that an overwhelming majority of commercial building occupants are not satisfied with the comfort conditions at their workstations or offices. Reasons for this comfort dissatisfaction include different levels of clothing insulation, different levels of work activity and/or a growing understanding that individuals appear to have different levels of inherent metabolic rates that require different surrounding thermal environments for each to be comfortable. Recent research work appears to indicate the inherent differences in individual metabolic rates may be more significant that has previously been considered. So, current building comfort conditioning strategies that are based on distributing air from VAV systems with air diffusers can at best result in relatively uniform space temperature conditions within each zone of a building. This is insufficient to keep a large majority of building occupants satisfied with their thermal environment.

The need remains to enable individuals in adjacent open area workstations to experience desired variance in thermal comfort sensation. And the need remains to improve individual occupant comfort while reducing the use of energy resources and environmental impact for the whole building.

SUMMARY OF THE INVENTION

The following is a summary of the invention to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

This disclosure in part is directed to a ceiling or overhead mounted personal air supply and comfort conditioning unit that connects to a conventional variable air volume (VAV) system in place of the diffusers and operates on a communications network that can be separate from the building automation system (BAS) network. This personal air supply unit, and its network, provides communication with the occupant, other personal air supply units, and other optional components, to a cloud-based server and computer, and with the building automation system (BAS). The network connection to the cloud server provides a two-way data communication link over which the system externally records and analyzes occupant preferences, provides information aggregated and condensed data to each occupant regarding environmental conditions, comparative energy use histories, etc. In an embodiment, this information may be assembled by aggregating data from conditions, energy use, and the occupant interaction at other workstations and condensing it so that each occupant can better understand how to interact with the system most effectively and is helped to set and achieve certain performance goals.

The cloud connection and comprehensive external analyses allow the occupant or occupants of a workstation to see the potential environmental benefits and consequences of the various decisions they may make regarding the comfort levels and operation of other power consuming equipment in their workstation. In some embodiments, the cloud server may also alert occupants to upcoming grid constraints such as demand response events and enlist occupant support in reducing power requirements to meet such events most effectively but with the least possible disruption to their work.

In an embodiment, an improved intelligent terminal unit for installation over a workspace in a building, comprises:

a generally rigid housing defining an interior volume of the unit;

a controller having a processor to execute stored instructions, the controller mounted in or coupled to the unit;

an inlet port for connection to a variable air volume (VAV) system to receive primary conditioned air flow into the unit:

an adjustable damper arranged to regulate flow of primly conditioned air through the unit;

an electronic damper actuator arranged for positioning the damper under control of the controller;

a sensor array coupled to the controller, the sensor array including a local space air temperature sensor to indicate a current air temperature in the workspace and a radiant sensor to provide an indication of a current radiant condition in the workspace;

a room air inlet arranged to receive room air from the workspace into the unit; an internal bi-directional variable speed fan arranged to mix room air with the primary conditioned air in the unit in which the speed and rotational direction provides controllable determinant air movement into the workspace;

an electric motor arranged to drive the internal fan under control of the controller; and at least one outlet vent that may be automatically adjustable to discharge the mixed room and primary conditioned air from the unit into the workspace;

wherein the controller is arranged to execute instructions to determine a current thermal comfort value of the workspace, based on multiple factors including at least the fan speed, the workspace air temperature, and the workspace current radiant condition.

The cloud connection along with the connection to the BAS also allows occupancy status, preferences, and interactions along with the use of advanced multivariable control algorithms to achieve greater overall building operating efficiency along with improved occupant comfort and building demand flexibility. Occupants located in adjacent open area workspaces can choose and experience different thermal sensation levels because each personal air supply unit adjustment features include not only the ability to adjust primary air flow and thus the space temperature, but also other thermal comfort factors—most specifically localized air movement—that allows localized individually adjustable thermal comfort sensations for each workstation, even adjacent workstations, in open office areas. The personal air supply unit can also interface with other workplace comfort, air cleaning, and other power consuming devices to more provide much improved overall comfort as well as regulate all energy consuming devices and systems in each workspace.

The innovation generally must be implemented in a combination of hardware and software (i.e., stored, machine-readable instructions) for execution in one or more processors. The volume, frequency and complexity of operations and communications involved preclude any manual or "pencil and paper" solution as impracticable. Such processors may be provisioned in the building server, zone controllers, subzone controllers, and smart terminal units. Additional logic may be implemented in HVAC systems at the building or campus level. The following is a detailed description of some preferred embodiments, which proceeds with reference to the accompanying drawings.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail using the accompanying drawings in which.

DETAILED DESCRIPTION OF PREFERRED EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments. Like numbers refer to like elements throughout the various views and drawings. As used herein, the term "and/or" includes any and all combinations of one or more of the associated listed items. We begin with the following review of the state of the art.

Figure 1:
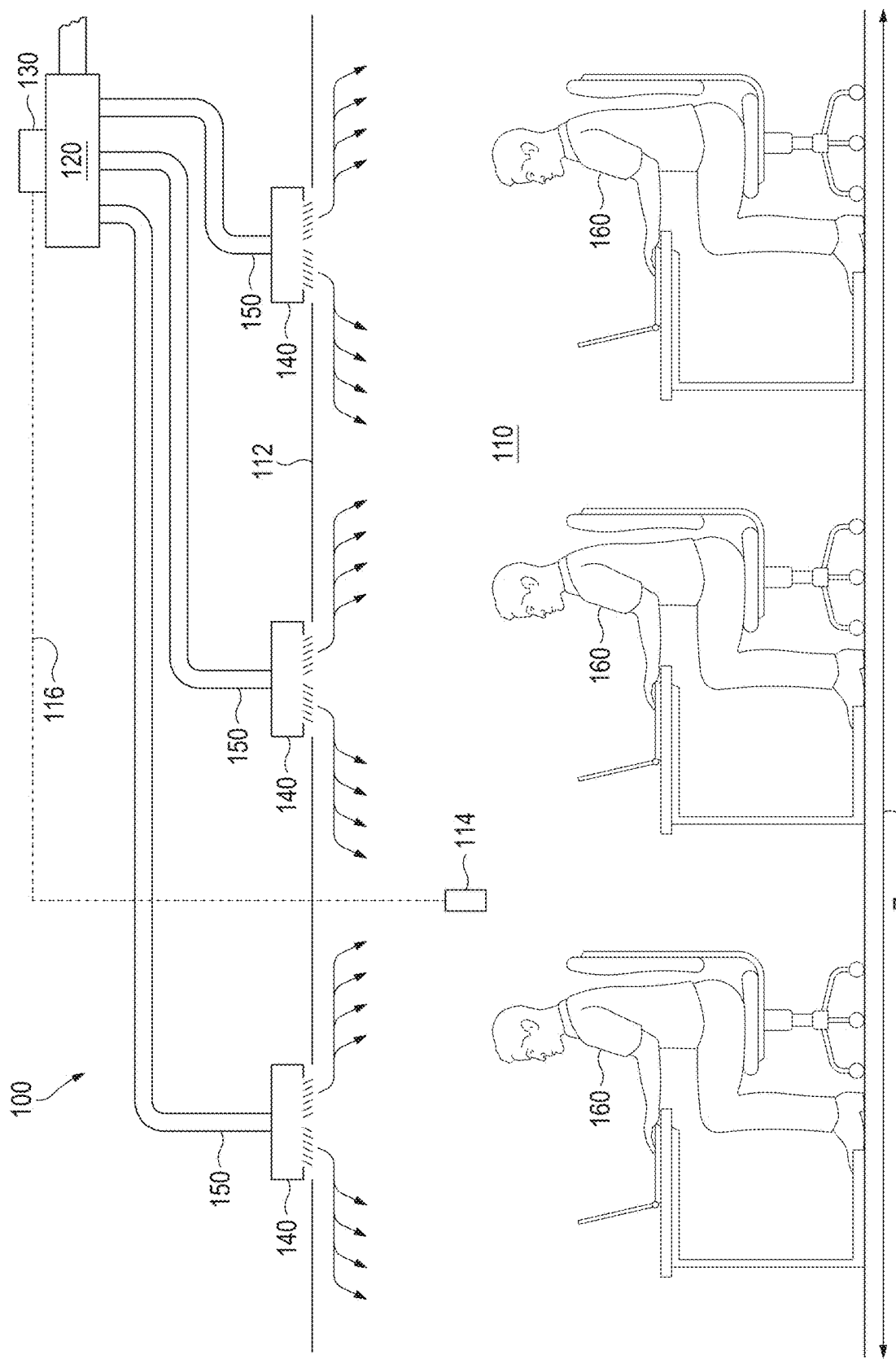
FIG. 1 (Prior art) is a simplified diagram that illustrates a variable air volume ("VAV") building comfort system for conventional temperature control of building spaces with a VAV box zone control unit and standard diffusers to distribute conditioned air to the zone, and a space temperature sensor, or thermostat, to regulate the flow of conditioned air in order to maintain a specific space temperature setpoint in the zone.

Typical HVAC systems that operate in commercial buildings supply conditioning to multiple "zones" within the building. In FIG. 1, diagram 100 illustrates conventional comfort control of building spaces in one zone with a variable air volume system which is the most commonly employed type in commercial buildings. In FIG. 1, a VAV box unit 120 regulates the flow of conditioning air to the zone it serves with standard diffusers 140 which may be mounted in or below the ceiling 112. In this arrangement, usually a single temperature sensor 114 located in zone 110 provides zone temperature to a VAV box controller 130 which is part of the building automation system (BAS). Airflow from the VAV box or air handler is established based on difference between zone temperature and temperature setpoint. The portion of zone air flow to each diffuser is fixed, established by initial system balancing. Airflow is provided to each diffuser by a suitable pipe, duct or the like, indicated by 150. Because the conditioned air from the VAV box is at a temperature that is too cold, or in winter too hot, to be comfortable, the airflow from ceiling diffusers 140 is directed across ceiling 112 where it mixes with, and cools, or warms, room air to lower or raise the space temperature, providing indirect conditioning to occupants below.

Each zone generally encompasses several hundred to a thousand or more square feet of occupied area, and each zone typically serves multiple occupants. Generally, just a single temperature sensor (sometimes referred to as a thermostat) 114 located somewhere in the zone is incorporated to control the source of conditioning to each zone. The zone temperature sensor 114 is coupled to the BAS zone controller 130 by a wired or wireless connection 116. There is very little and often no means for temperature adjustment within each zone to accommodate the different thermal preferences of the multiple occupants that inhabit the zone. Because each zone is independent from adjacent zones, there can also be issues among adjacent zones wherein attempting to maintain different thermal conditions between zones can result in the zones "fighting" each other to maintain different thermal conditions and resulting in additional energy expended without achieving noticeable thermal differences between adjacent zones. For this reason, allowing occupant adjustment of the zone thermostat is discouraged and often not allowed in commercial buildings.

Where local control is applied, the devices intended to enable individual thermal and lighting level adjustment are generally stand alone and not incorporated into the operation of the overall HVAC system. So, personal comfort devices such as supplemental heaters or temperature-controlled air diffusers because they are not incorporated into the HVAC system, are more likely to increase overall energy use. For example, operating a separate, independently controlled, local heat source such as a portable space heater may warm the air surrounding the temperature sensor that controls airflow to the zone a zone and cause the HVAC system to provide additional cooling to the zone, countering the effect of the local heat source and adding even more energy cost to its operation, and possibly resulting in additional discomfort to other zone occupants.

Figure 2:
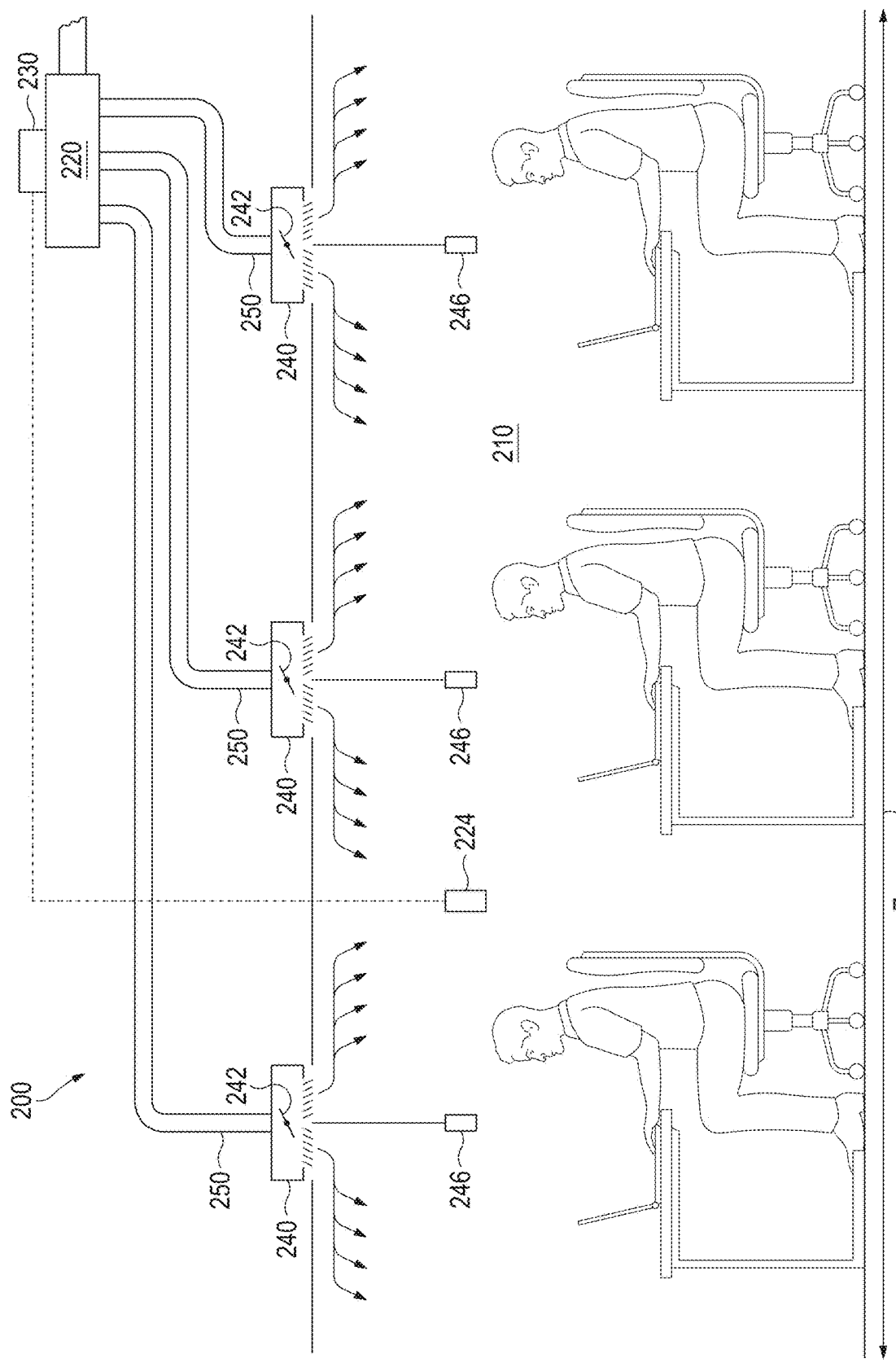
FIG. 2 (Prior art) is a simplified diagram that illustrates a ("VAV") building comfort system for conventional temperature control of building spaces with a VAV box zone control unit but using smart diffusers to distribute and control the flow of conditioned air to the zone.

FIG. 2 in the drawings, also prior art, illustrates control of a space with smart diffusers. The system is similar to that in FIG. 1 except as follows. In this arrangement, the zone temperature sensor 214 located in zone 210 still provides zone temperature to VAV box controller 230 to control the amount of conditioning air delivered to the zone from the VAV box as in FIG. 1. However, smart diffusers 240 replace the standard diffusers of FIG. 1 and by positioning their internal air dampers, adjust relative air flow among the smart diffusers in the zone. But due to the indirect means of distributing the conditioned air into zone, variations in the resulting conditioning cannot effectively target specific areas. Furthermore, airflow from VAV box 220 or air handler is established by VAV box controller 230 based on difference between zone temperature and temperature setpoint as in FIG. 1 so these smart diffusers do not generally affect the total conditioning supplied to the zone. A means of sensing local temperature is provided for each smart diffuser—most often entirely independent of VAV box temperature sensing and control. The individual smart diffuser temperature sensors 246 may be integrated into the smart diffuser or implemented as a separate wall-mounted sensor.

The portion of conditioned air flow to each smart diffuser 240 may be automatically adjusted with a corresponding damper 242 with actuator in each smart diffuser and is based on the local temperature and local setpoint at each smart diffuser. Airflow from each smart diffuser is directed across ceiling where it mixes with room air to provide indirect conditioning to occupants below. Occupants can change the local air flow by adjusting the temperature setpoint at each smart diffuser, but overall air flow and thus level of conditioning supplied to the zone is commonly established by zone thermostat 214 which is connected to the BAS VAV box controller 230. Local setpoint may be adjusted by wall-mounted interface, wireless connection, etc. The application of smart diffusers is usually able to make zone comfort conditions more uniform throughout at zone, but they are generally not effective in providing the variations in the thermal environment between adjacent workstations that may be desired by their occupants.

Thermal Comfort

Thermal comfort, for typical healthy individuals, is a sense of comfort determined by several factors in the individual's (or user's) environment, mainly the following: First, Space Temperature—this is the temperature in the space (for example, a subzone) that is measured with a common thermometer, which may be integrated into a component such as a terminal unit. This typically is the only means of comfort control in commercial building HVAC systems today.

The second thermal comfort factor, Mean Radiant Temperature, is the thermal effect of the heat that is radiated from the walls, windows, floor and ceiling in the space of interest. The "mean" radiant temperature is simply the combined effect of all of them (according to known formulae). Where a room has been at a stable temperature for some time, and only interior walls, floors, and ceiling, it is likely that the mean radiant temperature is equal to the space temperature because all these surfaces will have the same temperature as the space. But if, for example, it is cold outside and a user is sitting near a window, they will perceive a cooler thermal condition than the space temperature would indicate, because they are subject to a lower mean radiant temperature. In still air environments, one can approximate the mean radiant and space temperature are about equal in their effect on comfort. For example, if one is seated in a space that has a space temperature of 73 F and a mean radiant temperature of 71 F, their perception of comfort will be a surrounding temperature of approximately 72 F. For purposes of comfort calculations, Space and Mean radiant temperatures can be combined together in a term called "Operative Temperature." In this example, the operative temperature would be 72 F.

Third, Air Movement—This is the average velocity of the air surrounding a user as they occupy a space. The faster the air is moving around you, the cooler you feel due to the increased rate of conduction of heat from your body by the air movement. A small change in air movement by as little as 20 feet per minute (which is imperceptible to most people) has about a one degree F. change in thermal sensation, i.e., thermal comfort. Finally, Humidity in the range that exists in most commercial buildings has a very small effect on thermal sensation and is not considered here for the purposes of this application. The above factors together determine and describe a current thermal condition of a space. Below, we describe quantifying that condition as a current thermal comfort value.

Like the smart diffusers and other VAV air distribution devices that constitute prior art, some embodiments of the present disclosure may comprise a ceiling or overhead mounted unit that connects directly to a VAV zone air outlet, either directly to an air handler or through a VAV box as some air diffusers currently do. Also, like some existing art, each "Uniterm" personal workspace air supply unit preferably has the capacity to sense the local space temperature as well as local occupancy and has an integral damper to regulate the flow of primary air through the unit. It also permits the local occupant to request adjustment in the comfort conditions through a personal device such as a smart phone. Control devices may operate over wireless communication links. Each Uniterm unit preferably has the capacity to mix primary air and room air within its housing so that directing conditioning explicitly toward the local occupant is possible.

However, the present disclosure is directed to a novel Personal Workspace Air Supply and Comfort Conditioning Unit, also referred to as a Uniterm, that also has several features that are new and permit it to maintain substantial differences in the thermal environment between and among individual workstations in open areas. The unit may be arranged to operate some or all energy consuming devices and equipment in the workplace to satisfy occupant requirements, and to engage with each occupant to automatically keep their space at desired comfort levels throughout each workday. And, using both onboard and external logic, the Uniterm network, comprising a cloud-based server and communications capabilities, can also achieve maximum building operating energy efficiency by helping each occupant understand the environmental benefits and consequences of various comfort and operational decisions the occupant may request, and by optimizing the system based on occupant requirements for thermal conditioning. A Uniterm system engages each occupant in responding to power grid constraints for more effective load shedding and flexibility during demand response or partial curtailment events. In a preferred embodiment, a Uniterm system refers to the network serving one or more buildings in which at least some of the workspaces are served by an individual personal workspace air supply unit, a Uniterm, and the individual Uniterm units are connected over a communications network that includes a remote server as described herein.

Personal Local Comfort

Current art of VAV systems control only zone space temperature as a means for maintaining comfort. Separate devices such as desk based radiant panels or desk or ceiling fans are sometimes added, but these are standalone devices and are rarely integrated into and coordinated in any manner with the VAV system. In addition to clothing and activity levels, human thermal comfort sensation is a function of four external factors; 1) space temperature, 2) mean radiant temperature, 3) air movement around the individual, and 4) to a far lesser degree within normal ranges, the space humidity. It has been determined that small changes in air movement surrounding individuals has a significant influence on thermal comfort sensation. Using the comfort analysis tool that is employed by ASHRAE to determine compliance with its comfort standard, it can be seen that changes in air movement surrounding an individual of only 20 feet per minute, a change that is almost imperceptible, causes about a 1 Degree F. change in thermal comfort sensation for the individual experiencing that change. With a built-in fan and in some embodiments automatically adjustable air discharge vanes, the Uniterm has the capacity both to mix room air with primary conditioned air internally, and to regulate and direct air movement in and around the workstation it serves. Regulating the flow of primary air allows it to provide some space temperature control and controlling the level of local air movement results in its ability to regulate more than a single comfort parameter. Monitoring and controlling more than a single comfort factor in one unit and integrating this control with a standard building HVAC system is new and is a mainstay of this invention. It allows the Uniterm to provide substantial variances in thermal comfort sensation that may be desired by occupants in adjacent open area workstations because it can adjust different levels of localized air movement in adjacent workstations without causing objectionable drafts or other unsatisfactory environmental conditions.

Another aspect that is entirely new is the use automatically adjustable vanes to direct the conditioning air to be most effective in the workspace. While automatically adjustable vanes are not new—they are employed in some units to oscillate and spread sir back and forth in an area—this application is new in that can direct both conditioned air and regulated air movement toward the occupant(s). In this embodiment, the radiant temperature and occupancy sensing employs a multi-sensor array that detects the radiant temperature at several points from objects in the space. The same mechanism may detect occupancy by the temperature and the movement through the granular matrix of points within the space that are monitored by the array. This temperature and occupancy detection array has the capacity to detect the location of the occupant(s) in the conditioned space and the adjustable vanes can be employed to direct the conditioning to that specific location. The adjustable vanes are also employed to allow the Uniterm to condition larger multi-occupant spaces such as a conference room by spreading the conditioned air more generally within the conditioned area.

Though its wireless network, each Uniterm can also engage and control other means of local thermal comfort conditioning such as a workstation based radiant panel or heating device, thermal activated chair, desktop fan, or virtually any other workstation based device that is then automatically incorporated into the response to requests by the local occupant for changes in workstation comfort conditions.

Figure 3:
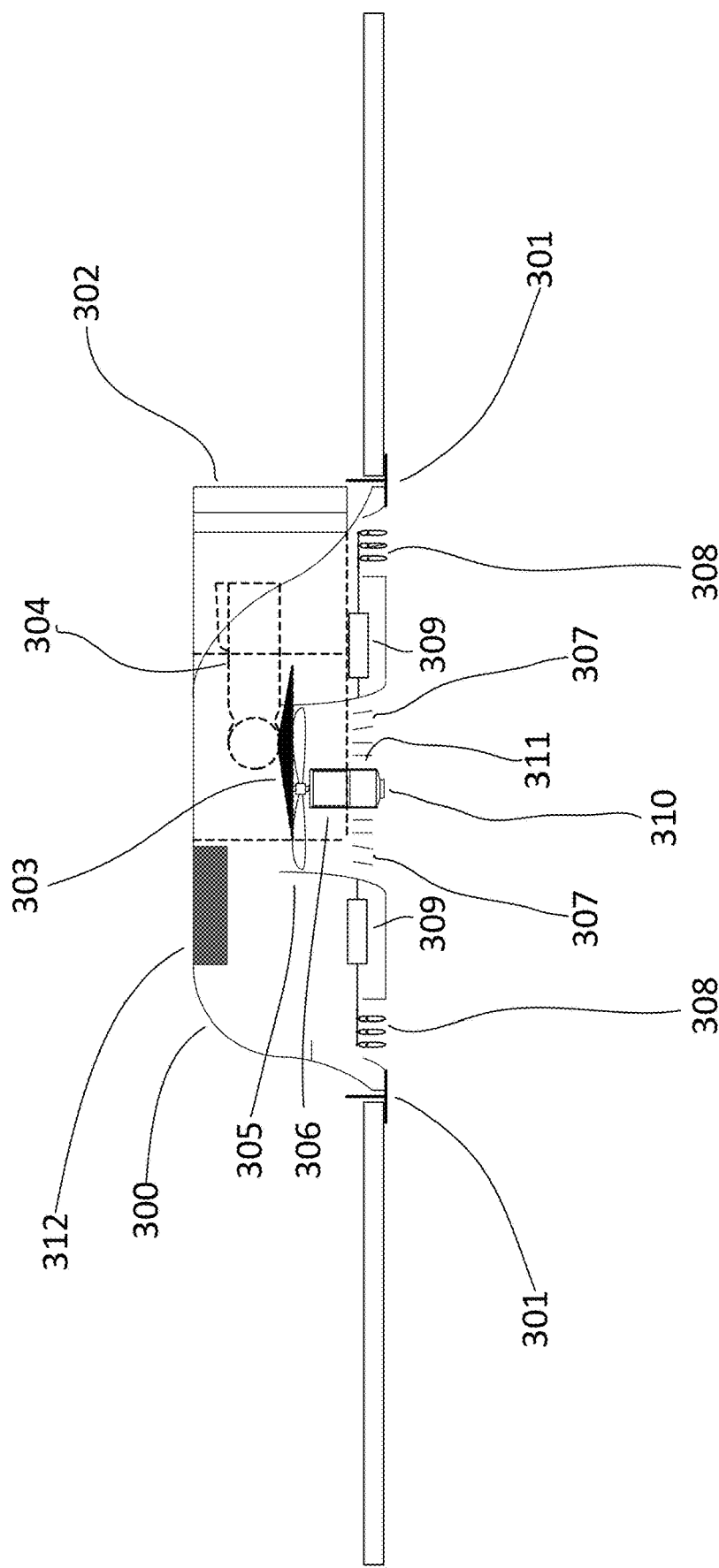
FIG. 3 is a simplified illustration of one example embodiment of a personal workspace air supply and comfort conditioning unit in accordance with the present disclosure.

FIG. 3 is a simplified illustration of one example embodiment of the present disclosure. The illustrated personal workspace air supply and comfort conditioning unit fits into a T-bar ceiling as a lay-in fixture, just as many standard air diffusers that it replaces. It is supported in part by the T-bar ceiling support grid (301). The unit is connected to the conditioned primary air supply to the space at the inlet port (302). The flow of primary air is regulated by a damper (303) that is adjusted by an electronic damper actuator (304) that also may incorporate an air velocity sensor and an air temperature sensor. Room air is drawn in through a room air inlet (307) and mixed with the primary air in the unit by a small fan (305) that is powered by an electric motor (306). The mixed room and primary air is discharged from the unit through the outlet vents (308) that can be positioned by electric actuators (309). A radiant sensor (310) is employed to determine radiant temperature and occupancy conditions in the space below the unit and may also determine the location of the occupant(s). An array of air quality sensors (311) measure the temperature, humidity and air quality of the room air as the air is drawn into the unit. A computerized controller and communications controller (312) employs sensing and analytics where necessary to evaluate the entire thermal comfort condition of the local environment—not just the space temperature. Using this more complete information, it operates the unit and provides communications with the occupant, other workplace equipment and units, the VAV box that supplies air to the zone, and to the cloud.

Integrated Control of Workspace Equipment

While products allow control of lights, plugs and other equipment through a wireless phone connection, the Uniterm allows each occupant to manage the control of all the equipment in their workspace through a single preferably wireless connection to the Uniterm. It allows, at the occupant's discretion, individual pieces of equipment to operate subject to occupancy as sensed by the Uniterm, to operate based on the thermal condition of the space, or combined with occupancy, as sensed by the Uniterm (this is most useful for auxiliary occupant thermal conditioning devices), or it allows equipment to operate in accordance with one or more schedules that the occupant can establish, or manually, or some combination of any of the above. Thermal comfort factors that are not directly sensed, such as air movement or a heated chair are incorporated into the thermal comfort assessment of the space through analytics in which the characteristics of the device or system are incorporated into the controls using the specific characteristics of each device. For example, local air movement may be a function of the speed of the fan; the comfort effect of a heated chair may be a function of the power input or a controllable comfort setting. In this way the Uniterm can at continuously or at least frequently assess and control the total comfort environment in which the local occupant(s) inhabit. And it can coordinate to determine the optimal configuration of the various comfort components, and optimize the entire system, including the HVAC system.

Direct Occupant Engagement for Environmental Benefits

While there is prior art regarding phone apps that provide general guidance to building occupants regarding the environmental consequences for various thermal or equipment operational decisions they may make, embodiments of the present invention may assess the real time requests that the occupant submits at a user interface and can provide guidance regarding cost and environmental consequences before the request is executed.

Figure 4:
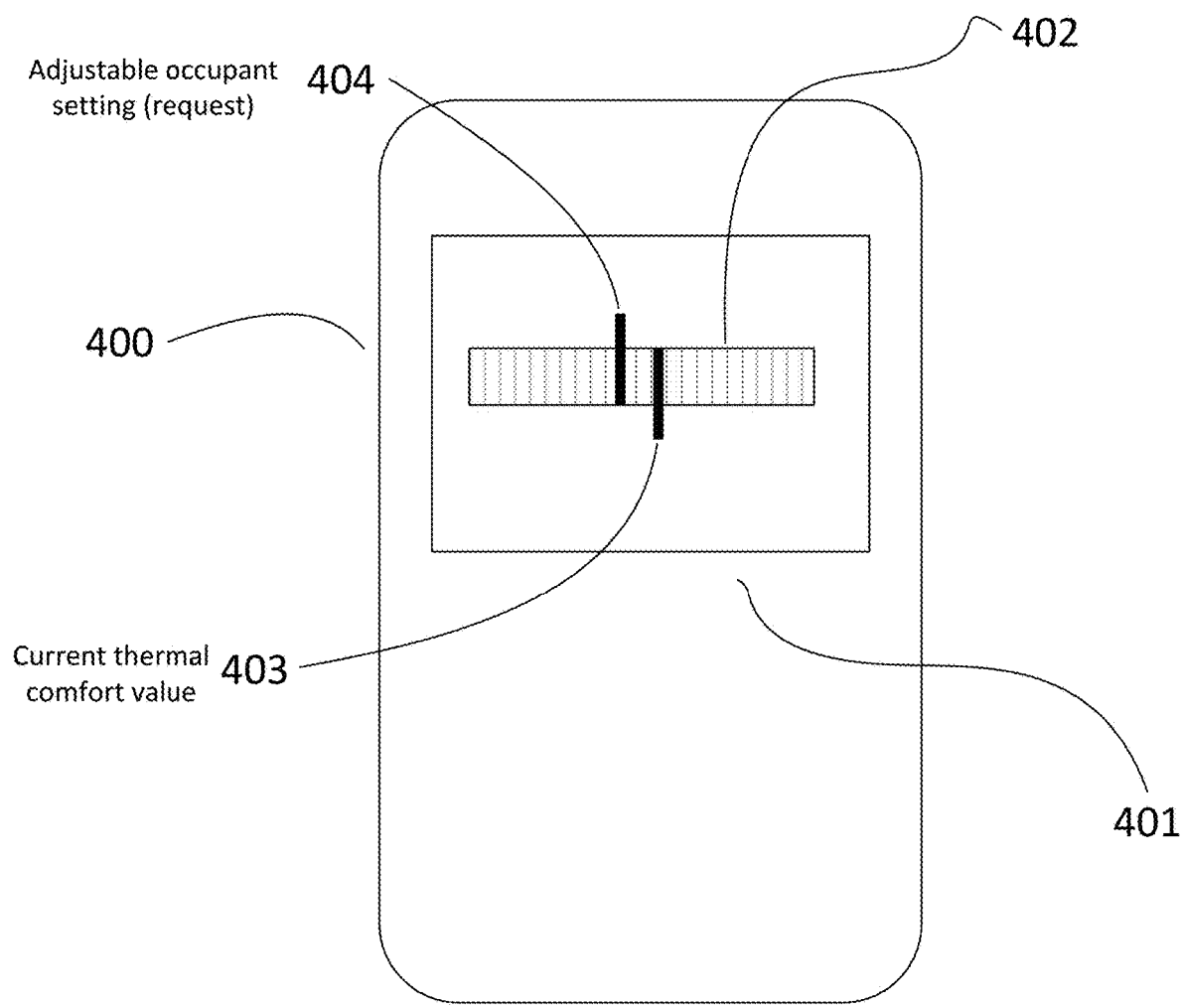
FIG. 4 is an example of a user interface screen display on a user device for managing a personal workspace thermal comfort.

FIG. 4 is an example of a user interface screen display on a user device for managing a personal workspace thermal comfort. It enables a user occupant to request thermal comfort changes. To date, because thermal comfort systems typically control only a single comfort factor, the temperature of the surrounding air or space temperature, thermal comfort is typically established as a temperature. But thermal comfort is really a combination of at least four environmental factors and may include others. For example, an occupant's desk chair may incorporate a heated seat cushion which, depending on the setting will raise the value of the thermal comfort level. While this comfort level is sometimes expressed in equivalent degrees of space temperature, the use of temperature alone is inaccurate as assumptions regarding air movement, radiant condition and humidity would also have to be included to denote specific thermal conditions.

We use the term "thermal comfort value" as a dimensionless value that is used to label the current combination of thermal comfort factors active in a workspace, and the requested thermal comfort value. In one embodiment of the invention, a color spectrum may be employed in a graphical user interface (in lieu of a number) for the occupant to easily observe what the current space thermal comfort value is and through which to make any desired adjustment. FIG. 4 illustrates an example of how this observation and adjustment process may be implemented. In FIG. 4, a smart personal device, or some type of wireless device (400) that is paired with the workspace Uniterm employs a graphic screen (401). User device 400 may be a smart phone executing a suitable thermal comfort app. On the screen, the Uniterm occupant app employs a rectangular thermal comfort value spectrum (402) which preferably is color gradated (coloring not shown) typically from left to right starting with blue on the left to red on the right to indicate the thermal comfort level spectrum. The current thermal comfort value of the space is transmitted wirelessly to this device from a Uniterm and displayed on the screen by a mark (403). The operation of the Uniterm control logic will attempt to keep this mark aligned with the occupant setting mark (404) which is adjustable by the occupant using touch screen or some other adjustment technique. When a change is made, that new value setting is sent wirelessly to the Uniterm which preferably will display the new setting on the screen and act upon this change. Appropriate labels should be applied so that each mark is clear to the occupant. Of course, other graphical presentations, for example, a wheel or round dial representing the current thermal comfort value of the space may be used and should be considered equivalents.

Referring again to FIG. 4, consider that the occupant has just made the adjustment illustrated. The occupant has moved the thermal comfort setting for this space to the left (404), away from the current thermal comfort value, toward the blue end of the spectrum indicating a cooler thermal comfort condition is desired. This change is transmitted to the Uniterm serving the space and is immediately acted upon. While the Uniterm may be connected to several local auxiliary thermal comfort components, in this example it is assumed that this is not the case and that only the Uniterm is available to meet the thermal comfort setting. In this case, the Uniterm can increase the flow of cool primary air (if the zone is in the heating mode, the Uniterm could decrease the flow of warm primary air) to reduce the space temperature in the space, and it can increase the speed of the fan to increase the air movement in the space. Space temperature conditions in adjacent, sometimes called neighboring, Uniterms may constrain the capacity to adjust space temperature conditions. However, incorporated in this invention is providing an immediate response to a thermal comfort request. Accordingly, the immediate response is to first select and employ the comfort component that can provide the most rapid response. Here, increasing air movement will rapidly change the current workspace comfort level value to the new occupant setting. This action accomplishes two benefits. First, it provides an immediate response to the request which is desired by the occupant. Second, because the response is immediate, the occupant can determine if the change in setting was sufficient or excessive in order to quickly modify setting to obtain desired thermal conditions.

Although the response is immediate and a correction in the thermal comfort level quickly meets the new setting, the system continues to calculate and adjust the thermal comfort components available to best meet the thermal comfort setting of this workspace in concert with the thermal comfort settings in neighboring workstations if any to optimize both the comfort and efficiency of the affected workstation(s). For example, if there are neighboring workstations, a determination is made through data aggregated from the other workstations, whether decreasing the neighborhood space temperature would benefit all the workstations, and if that would be beneficial for the energy required to operate the entire system. If the determination is that a lower space temperature would be beneficial, then the primary airflow is increased and the space temperature in the workspace (and in the neighboring workstations) is gradually reduced. As the space temperature is reduced in coordination with the space temperature reduction, the fan speed is adjusted to maintain the current thermal comfort setting in the workspace. Similar adjustments preferably are continually made in the neighboring workstations along identical parameters until a new optimum combination of comfort factors throughout the neighborhood is reached. If it is determined that a decrease in space temperature is not beneficial, the system continues to operate as it is until changes in conditions or settings dictate another coordinated adjustment of thermal comfort, components throughout the neighborhood. Using this example and the present disclosure, one knowledgeable in the operation of such systems can easily extend how a Uniterm that is not in a neighborhood, or a Uniterm with auxiliary comfort components, would be programmed to operate to achieve and maintain the requested local comfort setting.

Figure 5:
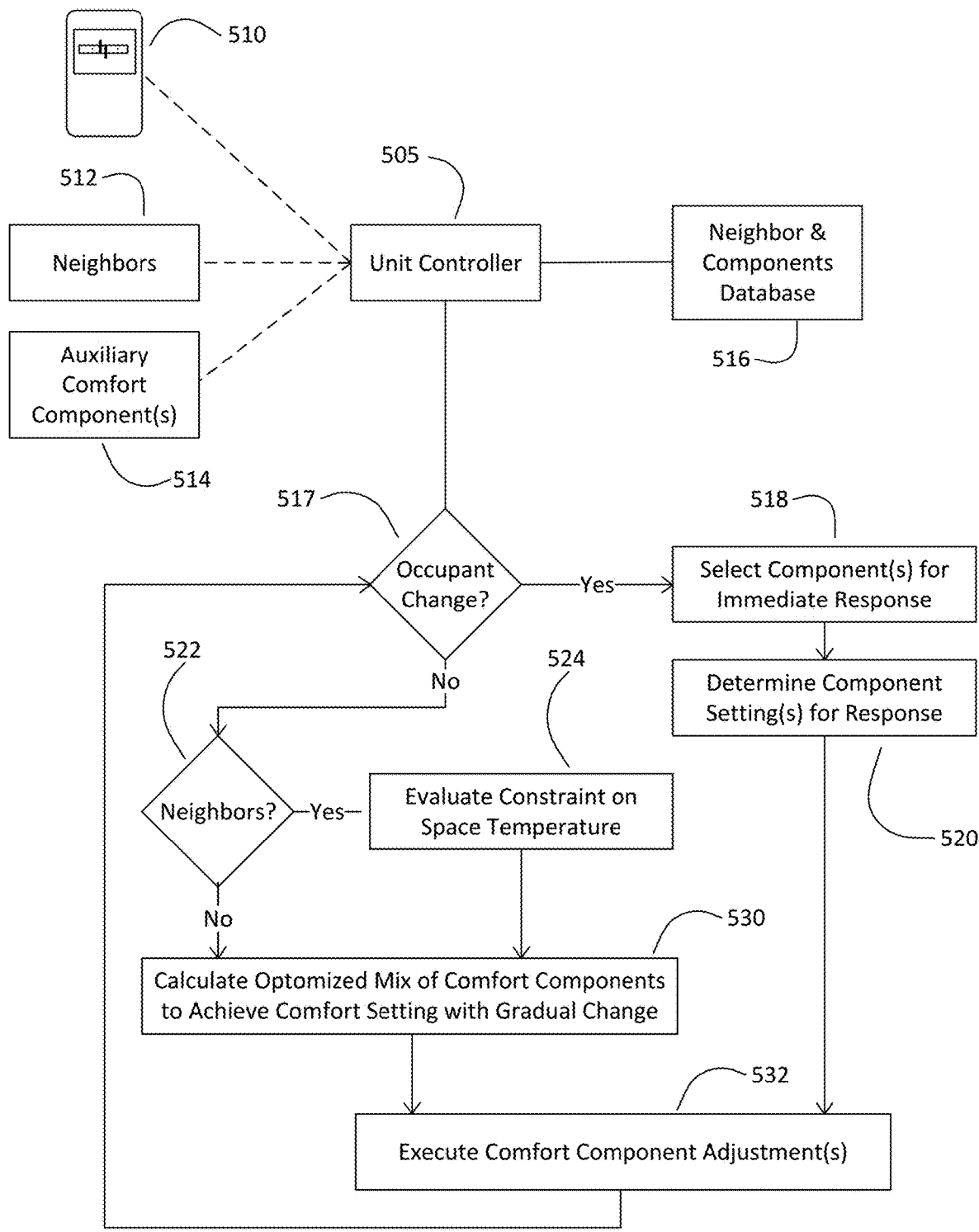
FIG. 5 is a hybrid system diagram and simplified flow diagram of programmable logic to adjust and maintain thermal comfort in a workspace in accordance with some embodiments of the present disclosure.

FIG. 5 is a hybrid system diagram and simplified flow diagram of programmable logic to adjust and maintain thermal comfort in a workspace in accordance with some embodiments of the present disclosure, in this example, an illustrative system may comprise one or more user devices 510, for example, a user device as described with regard to FIG. 4. The user device 510 is in wireless communication (indicated by a dashed line) with a terminal unit controller 505. In some embodiments, this component may correspond to the controller 312 in FIG. 3. Neighboring terminal units 512 also are in communication with the unit controller 505. These connections may be wired or wireless. Auxiliary comfort component(s) 514, if any are serving the subject workspace, also are communicatively coupled to the unit controller 505. Finally, the unit controller is operatively coupled to access a neighbor and components database 516. Data regarding certain operating characteristics and current status is maintained in the database (516). Preferably, the database may be incorporated into the unit controller.

The fundamental logic for the operation of the unit controller to maintain thermal comfort conditions in the workspace is also shown in FIG. 5. The controller is constantly looking for an occupant thermal comfort change request. If there is a change transmitted to the unit controller from the occupant through the occupant's control device (510), then, using the database of comfort components available (518) the component or combination of components that can produce the most immediate response to the requested change is engaged and the proper settings determined (520) and the adjustment is made (532).

If there has been no occupant request for change then the process reverts to ensuring optimal operation of the unit and system. For this process the unit first checks to see if there are neighbors (522) and if so, what constraints currently exist on space temperature control so as best meet the requested conditions in the entire neighborhood. For example, a change request may have occurred in one of the neighbors that tightens or loosens the space temperature constraint for this unit. In that case, a calculation is made (530) to meet or take advantage of the change in space temperature constraint in order to optimize overall operation. Once the determination of the correct combination and control of comfort components is made, any change, if necessary, is communicated to those components (532) if no change is necessary, the step is skipped and after a short delay, the process loops back to 517.

A change (517) may also be initiated by a change in occupancy. When the workstation first becomes occupied, in a preferred embodiment, the comfort request is automatically reset to the last occupied value or a default value unless a new request is received. Specifics for this and other operating factors may be determined through an initiating or unit setup routine during installation. When a workstation becomes unoccupied, a setback thermal comfort value is incorporated whose value may depend on the time of day and the period of unoccupancy. At such a time, the unit is essentially shut down so long as the thermal comfort condition is within a specific range of the current occupied thermal comfort setting. Occupancy may be determined in various ways, for example, utilizing the sensor array as described above.

Some of the features disclosed herein are summarized in the following paragraphs. This list is not intended to be exhaustive:

- Personal Workspace Air Supply and Comfort Conditioning Unit with a damper to control the flow of primary conditioned air from the VAV system into the unit AND an internal fan to mix room air with primary conditioned air in the unit and control the flow and movement of air in the space. Sensing devices to determine local space temperature, humidity, and radiant, temperature, and means to analytically calculate local air movement and other local thermal comfort parameters that are not or cannot be otherwise determined.
- Personal Workspace Air Supply and Comfort Conditioning Unit that provides individualized thermal comfort control by employing both localized space temperature and localized air movement control to maintain different thermal environments among closely spaced workstations where manipulating only space temperature variations would not be effective. Also, the ability to integrate other local thermal comfort devices into its operation when available and operate them in a coordinated fashion to achieve local thermal comfort conditions as requested by the occupant(s).
- Personal Workspace Air Supply and Comfort Conditioning Unit that can detect where occupants are in a workspace area and direct the desired conditioning toward that area.
- Personal Workspace Air Supply and Comfort Conditioning Unit combined with its own separate network that combines conditions and occupant preferences in each zone and then connects and communicates to the BAS to provide control adjustments based the Equal Marginal Performance Principle or other advanced multi-variable algorithmic means of integrating control of HVAC system components to improve the overall system operating efficiency.
- A method and system of communication networking in occupied spaces of commercial buildings to interact with occupants and the BAS to inform impacts of current preferences and then adjust for individual preferences for thermal conditions most economically.
- A method in which each local individual unit—through its network connection—can be adjusted automatically to reduce energy use in the event of a power demand response signal, and each workstation occupant can override or enhance such local adjustment if needed or allowed.
- Occupant can first be informed of cost before an override is carried out such that the occupant may wish to modify degree of override.
- Method in which the degree of adjustment on non-overridden units is adjusted iteratively to attain desired power reduction and counteract the override or enhancement action of some other occupants.
- A method of control of a VAV box damper wherein the VAV box serves multiple smart air distribution devices each with primary airflow control, wherein the airflow requirement of each device and the position of the damper for each smart diffuser is transmitted over a network and these airflow requirement and damper positions are employed to first calculate a the total airflow to arrive at a target VAV box airflow which is then adjusted within a limited range based on the average damper position and maximum position of one or more dampers in the smart devices served.
- A method of control of a VAV box damper wherein the VAV box serves multiple smart diffusers each with primary airflow control, and also serves one or more diffusers without primary airflow control, wherein the airflow and position of the damper for each smart diffuser is transmitted over a network and these positions are employed to calculate an estimated airflow for each smart diffuser which is that totaled to arrive at a target VAV box airflow which is then adjusted for additional flow to account for the flow desired to the diffusers without primary air flow control,
- A method in which each occupant can individually turn on or turn off the app that notifies them of the environmental consequences of, and comparisons with targets and others of the various decisions they make regarding the specific thermal level and equipment operations in their workstation they wish to make ahead of executing these actions.

Implementation Hardware and Software

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A personal air supply and comfort conditioning unit to provide thermal comfort in an individual workspace in a building, comprising:
   a generally rigid housing defining an interior volume of the unit;
   a controller having a processor arranged to process real time and stored data to assess multifactor current and desired thermal comfort conditions and execute instructions, the controller mounted in or coupled directly to the unit;
   an inlet port for connection to a variable air volume (VAV) box and VAV system to receive primary conditioned air flow into the unit, wherein the same VAV box is also connected to serve at least a second workspace distinct from the workspace;
   an adjustable damper arranged to regulate flow of primary conditioned air through the unit;
   an electronic damper actuator arranged for positioning the damper under control of the controller;
   a sensor array positioned adjacent the room air inlet, the sensor array configured to measure the temperature, humidity and air quality of the room air as the air is drawn into the unit;
   a room air inlet arranged to receive room air from the workspace into the unit;
   an internal fan arranged to mix room air with the primary conditioned air in the unit and provide controllable air temperature and air movement into the workspace;
   an electric motor arranged to drive the internal fan under control of the controller; and
   at least one outlet vent to discharge the mixed room and primary conditioned air from the unit into the workspace;
   wherein the controller is arranged to execute instructions to:
   determine a current thermal comfort value of the workspace based on multiple factors acquired from the sensor array including but not limited to the current workspace air temperature and air movement,
   compare the current thermal comfort value of the workspace to a thermal comfort setting, either a default value or responsive to input to a user interface; and
   based on the comparison, adjust air temperature and air movement discharged from the unit through the outlet vent to achieve the thermal comfort setting in the workspace by adjusting at least one of the damper position and the internal fan speed;
   wherein the damper position is adjusted by controlling the electronic damper actuator and the internal fan speed is adjusted by controlling the electric motor, the combination and magnitude of damper positioning and motor speed determining both air temperature and air movement discharged from the unit.

2. The personal air supply and comfort conditioning unit of claim 1 further comprising a radiant sensor disposed in the sensor array to provide an indication of a current radiant condition in the workspace; and
   wherein determining a current thermal comfort value of the workspace is based on multiple factors including at least the fan speed, the workspace air temperature, and the workspace current radiant condition.

3. The personal air supply and comfort conditioning unit of claim 2 wherein the radiant sensor monitors multiple points within the workspace below and the controller is arranged to employ data from the radiant sensor and execute instructions to determine current occupancy status and location of occupant(s) within the workspace.

4. The personal air supply and comfort conditioning unit of claim 3 further comprising electric actuators arranged for controllably positioning vanes in the outlet vents and wherein the controller is arranged to employ data acquired from the radiant sensor regarding occupant location within the space below to execute instructions to drive the electric actuators to position the outlet vent vanes so as to direct the mixed primary and room air in accordance with the determined location of occupant(s).

5. The personal air supply and comfort conditioning unit of claim 1 wherein the controller further executes instructions to—
   immediately adjust the fan speed responsive to a change in a thermal comfort level setting input to a user interface, and then calculate and over time readjust the thermal comfort components available to the workspace to best meet and maintain the thermal comfort setting of the workspace in concert with the thermal comfort settings in neighboring workstations if any to optimize the both the comfort and efficiency of the workstation.

6. The personal air supply and comfort conditioning unit of claim 1 wherein the controller further executes instructions to utilize at least one local auxiliary comfort component in combination with the conditioned air supply to the workspace to adjust thermal comfort in the workspace toward preset default comfort values or responsive to an occupant request for adjustment.

7. The personal air supply and comfort conditioning unit of claim 1 wherein the personal air supply and comfort conditioning unit implements or is coupled to a database arranged to store data associated with neighboring workspace personal air supply and comfort conditioning units and any auxiliary thermal comfort components available in the workspace.

8. The personal air supply and comfort conditioning unit of claim 1 wherein the controller includes or is coupled to a communications component for wired or wireless electronic communications, including communications with a user device and with any neighboring workspace personal air supply and comfort conditioning units.

9. The personal air supply and comfort conditioning unit of claim 8 wherein the controller further executes instructions to communicate with a user device using the communications component to receive a thermal comfort setting input to a user interface of the user device, and to send a current thermal comfort value for display on the user interface.

10. The personal air supply and comfort conditioning unit of claim 8 wherein the controller communicates with an application program provisioned on the user device, and the application program controls the user interface to display both the thermal comfort setting and the current thermal comfort value of the workspace.

11. The personal air supply and comfort conditioning unit of claim 8 and wherein the communications component includes at least one local communication interface for interfacing the controller to a local auxiliary comfort component to control the auxiliary comfort component and to receive status of the auxiliary comfort component.

12. The personal air supply and comfort conditioning unit of claim 8 wherein the communications component provides communications between the controller and at least one neighbor personal air supply and comfort conditioning unit in the same HVAC zone to receive data including neighbor workspace occupancy status, neighbor workspace current thermal comfort setting, and current thermal comfort value to optimize both the thermal comfort and efficiency of the workstations in the zone.

* * * * *